United States Patent [19]

Li

[11] Patent Number: 4,522,795

[45] Date of Patent: * Jun. 11, 1985

[54] PHOSPHONITRILIC CHLORIDE POLYMERS

[75] Inventor: Hsueh M. Li, Baton Rouge, La.

[73] Assignee: Ethyl Corporation, Richmond, Va.

[ * ] Notice: The portion of the term of this patent subsequent to Feb. 22, 2000 has been disclaimed.

[21] Appl. No.: 487,804

[22] Filed: Apr. 22, 1983

Related U.S. Application Data

[63] Continuation-in-part of Ser. No. 447,720, Dec. 7, 1982, Pat. No. 4,447,408, which is a continuation-in-part of Ser. No. 314,522, Oct. 26, 1981, Pat. No. 4,374,815.

[51] Int. Cl.$^3$ .............................................. C01B 25/10
[52] U.S. Cl. .................................................... 423/300
[58] Field of Search ........................................ 423/300

[56] References Cited

U.S. PATENT DOCUMENTS

| | | | |
|---|---|---|---|
| 3,443,913 | 5/1969 | Bieniek et al. | 423/300 |
| 3,545,942 | 12/1970 | Rice et al. | 423/300 |
| 4,374,815 | 2/1983 | Li | 423/300 |

OTHER PUBLICATIONS

Lund et al., *J. Chem. Soc.* (1960), 2542–2547.

*Primary Examiner*—John Doll
*Assistant Examiner*—Wayne A. Langel
*Attorney, Agent, or Firm*—Donald L. Johnson; John F. Sieberth; Joseph D. Odenweller

[57] ABSTRACT

Linear phosphonitrilic chloride polymers are produced from phosphonitrilic chloride oligomers by means of a two-stage process. In the first stage a mixture of phosphonitrilic chloride oligomers enriched in linear oligomer is heated with at least a stoichiometric amount (and preferably an excess) of ammonia or ammonium chloride while concurrently removing hydrogen chloride to produce an intermediate reaction product. In the second stage the molecular weight of the reaction product is increased by heating the product to a higher temperature than the average temperature used in the first stage. Cyclic phosphonitrilic chloride oligomer may be present in the initial oligomer. Preferably, cyclic phosphonitrilic chloride oligomer is recovered from the reaction mixture after the start of the second stage. Most preferably it is recovered after completion of the second stage. At least a portion of the recovered cyclic oligomer may be used in a subsequent first stage reaction.

25 Claims, No Drawings

1

PHOSPHONITRILIC CHLORIDE POLYMERS

REFERENCE TO RELATED APPLICATIONS

This is a continuation-in part of my copending application Ser. No. 447,720, filed Dec. 7, 1982, now U.S. Pat. No. 4,447,408, which in turn is a continuation-in-part of my still earlier application, Ser. No. 314,522, filed Oct. 26, 1981, now U.S. Pat. No. 4,374,815, issued Feb. 22, 1983.

TECHNICAL FIELD

This invention relates to a process for producing linear phosphonitrilic chloride polymers. More particularly this invention relates to a process in which such polymers are produced from phosphonitrilic chloride oligomers of lower moleclar weight.

BACKGROUND

The customary method for the preparation of linear phosphonitrilic chloride polymers involves ring-opening polymerization of phosphonitrilic chloride trimer. Although workable, this method suffers from the fact that for satisfactory results to be achieved, highly pure cyclic phosphonitrilic chloride trimer must be used as the monomer. Such material is difficult and expensive to prepare.

Heretofore some work has been devoted to forming phosphonitrilic chloride polymers from lower molecular weight phosphonitrilic chloride oligomers. For example in J. Chem. Soc. 1960, 2542-7, Lund et al report an experiment in which a linear phosphonitrilic chloride oligomer of the formula $(PNCl_2)_{11}PCl_{4.2}$ was heated with ammonium chloride in sym-tetrachloroethane under reflux. Polymerization occurred after 5.5 hours, at which time the amount of hydrogen chloride evolved corresponded to the composition $(PNCl_2)_{10.6}PCl_5$. The rubbery product was extracted with light petroleum giving a significant quantity of a dark oil containing 10.5 percent $PNCl_2$ trimer, the remainder of the oil consisting of cyclic polymers higher than the heptamer.

Moran in J. Inorg. Nucl. Chem. 30. 1405-13 (1968) investigated the thermal polymerization of the linear compound $[Cl(PCl_2=N)_3PCl_3]PCl_6$ in evacuated sealed tubes at 300° C. for 5 hours and at 350° C. for 5 hours. The phosphorus NMR spectrum of both samples indicated that polymers of other chain lengths were formed. The results in the 300° C. case suggested to Moran that polymerization to the longer chain length compound $[Cl(PCl_2=N)_6PCl_3]PCl_6$ probably occurred. The NMR spectrum of the sample heated at 350° C. indicated to Moran that polymers of both longer and shorter chain lengths were formed.

G. Allen et al in Polymer 11, 31-43 (1970) report attempts to prepare linear $PNCl_2$ polymer by reacting $PCl_5$ with ammonium chloride in ortho-dichlorobenzene, the ammonium chloride being introduced by stepwise addition to the reaction mixture. They were in hopes that the following reactions would occur:

(a)
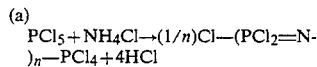

(b)
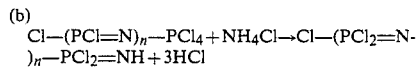

(c)
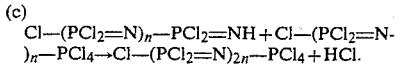

However they obtained very low molecular weight polymer (intrinsic viscosity of trifluoroethoxy derivative was below 0.05 dL/g). When they tried to increase the molecular weight of the polymer product by reacting it with $NH_4Cl$ in o-dichlorobenzene solvent, they obtained a crosslinked material.

U.S. Pat. No. 3,443,913 discloses a method wherein linear $(PNCl_2)_{3-15}$ oligomers are heated at 240°-260° C. to produce linear phosphonitrilic chloride polymers having a molecular weight between 3,000 and 10,000. However, this process involves heating for long periods of time, the endpoint of the polymerization occurring about 40 to 60 hours after heating has been initiated. The product obtained via this process is reported to be a dark orange viscous oil. See also James M. Maselli, Thomas Bieniek and Rip G. Rice (W. R. Grace and Company), Phosphonitrilic Laminating Resins, Air Force Materials Laboratory, Technical Report AFML-65-314; Wright-Patterson Air Force Base, Ohio: June, 1965, pages 18-19, which describes this same process. At page 47 of this report Maselli et al describe an experiment wherein oligomeric phosphonitrilic chloride was placed in a resin kettle fitted with a nitrogen inlet, stirrer and exhaust tube condenser. The kettle was heated to 250°±10° C. for a total of 55 hours while the polymeric $(PNCl_2)_n$ was stirred under a blanket of dry nitrogen. Samples of the reaction material were taken at selected intervals of time during the heating for molecular weight determination. The resulting data were as follow:

| Time (Hours) | Molecular Weight (VPO) |
|---|---|
| Start | 700 |
| 10 | 1200 |
| 40 | 3200 |
| 55 | 6900 |

According to the authors, when heating was continued for an additional 8 hours at temperatures in excess of 250° C., the viscous, soluble oil (molecular weight 6900) was converted to the familiar insoluble "inorganic rubber".

In U.S. Pat. No. 3,545,942 which in part discloses a method of thermally stabilizing phosphonitrilic chloride oligomers by heating them in an inert atmosphere for 2 to 8 hours at 240° to 260° C., Rip G. Rice et al indicate that prolonged heating of the oligomer can result in the formation of an "inorganic rubber". A decade earlier Lund et al (op. cit.) referred to an experiment in which heating of a linear phosphonitrilic chloride oligomer in tetrachloroethane solution resulted in polymerization after 29 hours.

In prior applications Ser. No. 956,227 filed Oct. 30, 1978 and Ser. No. 176,926 filed Aug. 11, 1980, a distinctly superior thermal polymerization process is described wherein linear phosphonitrilic chloride oligomer is heated to 275° to 350° C. for 1 to 20 hours while concurrently withdrawing phosphorus pentachloride vapor from the liquid phase. A similar procedure is described in Japanese Laid-Open Application (Kokai) No. 55-27,344 published Feb. 27, 1980. In this case a linear phosphazene oligomer usually having a degree of polymerization of 3 to 15 is heated under reduced pressure (usually less than 20 mm Hg) to produce linear polymers. Heating for five hours or more at 100°–300° C. is suggested. Unfortunately, phosphorus pentachloride vapor is extremely corrosive at elevated temperatures—it tends to rapidly corrode even the most expensive corrosion-resistant metals used in the manufacture of corrosion-resistant chemical reactors.

Japanese Kokai No. 55-56,130 published Apr. 24, 1980 describes a method for producing phosphazene polymers in which a linear phosphazene oligomer is heated in the presence or absence of a solvent at 50° to 300° C. using a Lewis base such as urea, thiourea, polyurea or polythiourea as a catalyst for increasing molecular weight.

Japanese Kokai No. 55-56,129 published Apr. 24, 1980 discloses a process in which ammonium chloride is used as the catalyst in a reaction involving heating phosphazene oligomer at 150°–350° C. in a closed system. For example, a solution of linear and cyclic phosphonitrilic chloride oligomers in dichlorobenzene containing a small amount of ammonium chloride catalyst was heated at 255° C. for 10 hours in a sealed tube to form the polymer.

Japanese Kokai No. 55-25,475 published Jan. 23, 1980 describes formation of phosphazene polymers by reacting a phosphorus source (e.g., $P+Cl_2$; $PCl_3+Cl_2$; $PCl_5$) with a nitrogen source (e.g., $NH_3$; $NH_4Cl$) in any of three reaction systems:
(1) In a solvent that does not dissolve the phosphazene polymers, such as an aliphatic hydrocarbon or alicyclic hydrocarbon that is resistant to halogenation.
(2) In an undiluted (concentrated) reaction system having a small quantity (250 ml or less per mole of P source reactant) of a solvent capable of dissolving the phosphazene polymers that is resistant to halogenation, such as a halogenated aromatic hydrocarbon.
(3) In a phosphazene oligomer as the solvent.

Japanese Kokai No. 55-65,228 published May 16, 1980 describes a method for producing phosphazene polymers in which a mixture of linear phosphazene oligomer, which has been stabilized with phosphorus pentachloride, hydrogen chloride or a metal halide, and cyclic phosphazene oligomer, is heated at 150° to 350° C. in a closed system having a solvent or non-solvent in the presence of a Lewis base catalyst. Urea, thiourea, polyurea, and polythiourea are examples of Lewis base catalysts used.

Japanese Kokai No. 55-50,027 published Apr. 11, 1980 discloses performing thermal ring-opening polymerization of cyclic phosphazene oligomers in the presence of linear phosphazenes stabilized with a metal halide, notably the linear oligomers formed as by-products when synthesizing the cyclic oligomers with metals or metal salts as catalysts. Such linear oligomers are indicated to have a degree of polymerization in the range of 2 to 100.

Japanese Kokai No. 55-60,528 published May 7, 1980 discloses a process wherein phosphazene polymers are formed by heating phosphazene oligomer at 150° to 350° C. in a closed system in the presence of a Lewis acid such as urea, thiourea, polyurea or polythiourea. The phosphazene oligomer is a mixture of linear phosphazene oligomers (5 to 95 weight percent; stabilized with phosphorus pentahalide or hydrogen halide) and cyclic phosphazene oligomer.

Japanese Kokai No. 55-43,174 published Mar. 26, 1980 describes a process for producing phosphazene polymers in which cyclic phosphazene oligomers are subjected to thermal ring-opening polymerization in the presence of linear phosphazenes which have been stabilized by phosphorus pentahalides or hydrogen halides.

Despite the variety of approaches studied, no completely satisfactory method for producing linear phosphonitrilic chloride polymers from linear phosphonitrilic chloride oligomers has been reported to date. Among the unsolved problems or shortcomings plaguing the prior methods noted above are the following:
formation of polymers of molecular weight lower than desired
formation of impure or cross-linked polymers having undesired properties or characteristics
requirement for long reaction or polymerization periods with consequent low reactor productivity
formation of highly corrosive coproducts such as phosphorus pentachloride at extremely high temperatures which necessitates use of very expensive corrosion-resistant reactors
necessity of solvent extraction operations to remove cyclic oligomeric by-products and other time-consuming, difficult and costly separation procedures and their attendant problems
formation of the desired polymer in yields lower than desired
need for very high reaction or polymerization temperatures.

A welcome contribution to the art would be the provision of a process avoiding these difficulties and shortcomings.

THE INVENTION

In accordance with this invention a process is provided whereby linear phosphonitrilic chloride polymers can be readily produced from phosphonitrilic chloride oligomers of lower molecular weight. The problems, difficulties and shortcomings of prior procedures noted above are eliminated or at least significantly reduced. Polymers of desired molecular weights (e.g., average degrees of polymerization in the range of 20 to 1000 or more) can be formed in good yield and high purity at relatively moderate temperatures in relatively short reaction periods. The highly corrosive phosphorus pentachloride is not formed and the process is capable of being performed in relatively simple and economical reaction equipment. Complex separation procedures are not required.

To achieve these and other attendant technical and economic advantages of this invention, use is made of an improved two-stage process. In the first stage a mixture of phosphonitrilic chloride oligomers enriched in linear oligomer is heated with at least a stoichiometric amount (and preferably an excess) of ammonia or ammonium chloride while concurrently removing hydrogen chloride to produce an intermediate reaction product. In the second stage the molecular weight of the reaction product is increased by heating the product to a higher temperature than the average temperature used in the first stage.

More particularly, the process for preparing linear phosphonitrilic chloride polymers from phosphonitrilic oligomers, is improved pursuant to this invention by heating a mixture of phosphonitrilic chloride oligomers enriched in linear phosphonitrilic chloride oligomer and at least a stoichiometric amount (preferably an excess) of ammonium chloride or ammonia in a first stage to a reaction temperature in the range of from about 120 to about 200° C. (preferably from about 130° to about 180° C.) for from about 0.5 to about 15 hours (and preferably from about 1 to about 12 hours) while concurrently removing hydrogen chloride to produce an intermediate reaction product. Then in a second stage the reaction product is heated to a higher temperature in the range of from about 150° to about 280° C. (preferably from about 170° to about 240° C.) for from about 1 to about 36 hours (preferably from about 4 to about 24 hours) to increase the molecular weight of the polymer. The "higher temperature" used in the second stage is an average temperature that preferably is at least five and most preferably at least ten Centigrade degrees higher than the average temperature used in the first stage.

In general, the higher the temperature in the second stage reaction, the shorter the reaction period.

A feature of this invention is the fact that the oligomer employed may either be a mixture of linear and cyclic oligomers or it may be a mixture of linear oligomers essentially devoid of cyclic components. From the standpoints of ease of processing and process economics, use of a mixture of linear and cyclic oligomers is preferred provided that the mixture is enriched in (i.e., contains more than 50 mole percent of) linear oligomers. Particularly preferred mixtures contain from about 60 to about 90 mole percent of linear oligomers, the balance being essentially cyclic oligomers.

In a preferred embodiment of this invention, cyclic phosphonitrilic chloride oligomers are separated from the heated reaction mixture during the course of the second stage of the process. Alternatively and most preferably, phosphonitrilic chloride oligomers are separated from the phosphonitrilic chloride polymer after completion of the second stage reaction. In either case at least a portion of the recovered cyclic oligomer may be used as feed for the first stage reaction, for example by recycle or otherwise.

An important facet of this invention is to employ in the first stage a phosphonitrilic chloride oligomer having an average degree of polymerization of at least 3 and preferably at least 4. In other words, the oligomer raw material for the process—normally a mixture of oligomer molecules of somewhat differing molecular weights—should have a number average degree of polymerization of 3 and preferably 4 or more. Thus the linear oligomer used in the first stage is at least predominantly oligomer which may be represented by the formula:

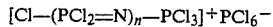

wherein n is a numeral which averages at least 3 and preferably at least 4, e.g., a numeral in the range of 3 to 15 or more and preferably in the range of 4 to 15 or more. Minor quantities of linear oligomer of the formula:

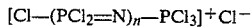

in which n is as defined above may also be present. Cyclic phosphonitrilic chloride oligomers which may be (and preferably are) present in the first stage reaction may be represented by the formula:

wherein n is a numeral of at least 3, e.g., a numeral in the range of 3 to about 8 or more.

Methods for the preparation of oligomers as above described are well known and reported in the literature. One typical procedure involves refluxing a mixture of phosphorus pentachloride and ammonium chloride in a suitable solvent for a suitably long reaction period and distilling off the solvent under reduced pressure. In this manner a product composed of a mixture of linear and cyclic oligomers is formed. By extracting the oligomeric product with a suitable extraction solvent such as hexane, residual amounts of the reaction solvent and cyclic oligomers formed during the reaction may be separated, if desired. One such procedure successfully used in practice involves forming a mixture of about 6.0 kg of phosphorus pentachloride, about 1.2 kg of ammonium chloride and 3 liters of monochlorobenzene. Such mixture is refluxed in a 12-liter reactor at atmospheric pressure for 4 days at about 131° C. Hydrogen chloride evolved during the reaction is absorbed in aqueous scrubbers. At the end of this time the chlorobenzene solvent is stripped off under reduced pressure at 60° to 80° C. This product itself may be employed as a feed to the first stage of the process of this invention. Alternatively, the stripped product is extracted with hexane in order to remove residual amounts of chlorobenzene solvent and cyclic oligomers. Such a product is also suitable for use in practicing the process of this invention. Another very useful method for preparing oligomers suitable for use in the practice of this invention is described in U.S. Pat. No. 4,198,381, the disclosure of which is incorporated herein.

As noted above the nitrogen source as used in first stage is preferably ammonia or ammonium chloride, or both. The quantities in which the nitrogen source material is used are not critical provided that a sufficient amount is introduced into the reaction mixture to provide at least the stoichiometric amount required to react with the linear phosphonitrilic chloride oligomer present in the system. For convenience, it is preferred to employ an excess over the stoichiometric amount relative to the quantity of linear oligomer being reacted. Preferably, the entire amount of ammonia or ammonium chloride being used in the reaction is charged into the reaction vessel at the start of the reaction. However, the ammonia or ammonium chloride can be introduced into the reaction mixture on an incremental or continuous basis during the course of all or a portion of the first stage reaction.

On heating the nitrogen source material with the phosphonitrilic chloride oligomer, polymerization takes place along with the formation of cyclic phosphonitrilic chloride oligomer and hydrogen chloride. An important feature of this invention is that the hydrogen chloride is removed from the reaction zone, preferably essentially as soon as it is formed. This is accomplished by performing the reaction in an open reaction system, "open" in the sense that the hydrogen chloride is able to leave or be carried away from the reaction zone such as by a sweep of inert gas, application of a vacuum, or the like.

As noted above, cyclic phosphonitrilic chloride oligomer present in the reaction mixture from the first stage preferably is recovered either during or after the second stage reaction, or both. To effect such separation of cyclic oligomer, use may be made of several different process techniques. For example, all or a portion of the second stage reaction may be performed in a boiling inert organic liquid whereby the liquid vapors drive off the cyclic phosphonitrilic chloride oligomer. Another method is to perform all or a portion of the second stage reaction at a reduced pressure so that at the temperature employed the cyclic phosphonitrilic chloride oligomer is distilled from the reaction mixture. Still another way of effecting the removal of the cyclic phosphonitrilic chloride oligomer is to sweep the heated second stage reaction mixture with an inert vapor or gas. In this way the entrained cyclic oligomer is carried away from the reaction zone during the course of the reaction. In all such cases it is desirable that the second stage reaction mixture be suitably agitated both during the reaction and during the removal of the cyclic oligomer.

Instead of removing the cyclic oligomers during the course of the second stage reaction, it is preferable to separate the cyclic oligomers from the linear phosphonitrilic chloride product after completion of the second stage reaction. While various methods may be used for effecting this separation, it is preferable to extract the reaction product formed in the second stage reaction with a suitable inert solvent such as hexane or the like.

The first stage of the process may be performed in the presence or absence of an inert organic liquid as diluent. In most cases it is preferable to conduct the first stage in bulk (i.e., in the absense of added reaction solvent or diluent) as this reduces the size requirements for the reaction vessels.

When employing solvents in the first stage, use may be made of such materials as saturated cycloaliphatic hydrocarbons (e.g., 1,2-dimethylcyclohexane, etc.), aromatic hydrocarbons (e.g, toluene, xylenes, trimethylbenzenes, ethylbenzene, methylnaphthalenes, etc.), chlorinated hydrocarbons (e.g., 1,4-dichlorobutane, tetrachloroethane, chlorobenzene, dichlorobenzenes, etc.), and other similar inert materials.

When employing ammonium chloride as the nitrogen source material in the first stage reaction, the reaction time of the first stage can be significantly reduced by reducing the particle size of the ammonium chloride used. For example, conversion of linear oligomer to linear polymer using ammonium chloride having a relatively small mean particle size of about 86 microns may be completed at a temperature of about 160° C. after about one hour. On the other hand, when ammonium chloride having a relatively large mean particle size of about 115 microns is used, the polymerization rate at the same reaction temperature is slower and the yield of desired product is lower. The mean particle size of the ammonium chloride is preferably within the range of about 1 micron to about 100 microns and most preferably within the range of about 1 micron to about 90 microns.

In accordance with other preferred embodiments of this invention the ammonium chloride is further characterized by satisfying additional particle size parameters. Such parameters may be represented by the following designations:

PH, which stands for 10 volume % of particles greater than the value of the microns stated
PM, which stands for 50 volume % of particles greater than the value of the microns stated
PS, which stands for 90 volume % of particles greater than the value of the microns stated.

For example, a PH of 145 microns, a PM of 83.8 microns and a PS of 37.4 microns means that the sample contains 10 volume % of particles greater than 145 microns, 50 volume % greater than 83.8 microns and 90 volume % greater than 37.4 microns, respectively.

Thus in accordance with these further preferred embodiments the ammonium chloride employed has in addition to the foregoing Mean Values a PH below about 180 microns and most preferably below about 160 microns, a PM below about 90 microns and most preferably below about 85 microns, and a PS below about 45 microns and most preferably below about 40 microns.

Ammonium chloride having a relatively small particle size may be prepared, for example, by reacting hydrogen chloride gas with ammonia gas. If the ammonium chloride is formed and used in situ without first isolating the ammonium chloride, the particle size will have a Mean Value less than about 86 microns—i.e., a Mean Value as low as about 5 microns.

Once the first stage reaction has been completed, the second stage reaction is carried out by heating the resultant reaction mixture, preferably in an inert liquid solvent, at a suitably elevated temperature which on the average is higher than the average temperature employed in the first stage reaction, optionally in the presence of ammonia or ammonium chloride. The second stage is conducted for a time period sufficient to increase the molecular weight of the linear phosphonitrilic chloride polymer. When ammonium chloride is used in the second stage, it is preferable to use an ammonium chloride having a relatively small particle size as discussed above.

Generally speaking, the longer the reaction time in the second stage, the higher the molecular weight of the resultant linear phosphonitrilic chloride polymer. Accordingly, the reaction time for the second stage reaction may be varied within relatively wide limits although ordinarily times in the range of 1 to about 36 and preferably from about 4 to about 24 hours will usually be used. As noted, at least a portion of the second stage reaction may be performed in the presence of ammonia or ammonium chloride (or both) and such material(s) may be introduced into the reaction mixture at the start and/or during the course of the reaction. Alternatively, such material(s) may constitute residual ammonia or ammonium chloride remaining in the reaction mixture after completion of the first stage reaction.

A wide variety of inert solvents may be employed in the second stage reaction. These include inert chloroaliphatic, cycloaliphatic, and aromatic solvents of various types. While various cycloalkanes, chloroalkanes and chlorocycloalkanes having appropriate boiling points are thus suitable for this process, it is preferred to use an inert aromatic solvent such as aromatic hydrocarbons and chloroaromatic hydrocarbons having boiling points at least as high as the reaction temperature being used in the second stage. Preferred solvents of this type include toluene, xylenes, methylnaphthalenes, chlorobenzene, dichlorobenzenes, trichlorobenzenes, etc.

If desired, the first and second stages may both be performed in the same solvent.

The amount of solvent used in the second stage is preferably regulated so as to keep the reaction mixture in a relatively concentrated solution while avoiding excessive gelation. Thus it is desirable to perform the second stage in a relatively concentrated reaction solution with periodic or continuous addition of solvent to maintain the reaction mixture in a fluid state as the reaction proceeds.

If it is desired to recover the linear phosphonitrilic chloride polymeric product from the reaction solvent used in the second stage, various techniques are available for use. For example, the solvent may be distilled off using an appropriate combination of reduced pressure and distillation temperature. Alternatively the linear phosphonitrilic chloride polymer may be precipitated from the solvent by the addition of the solution to a suitable non-solvent such as pentane or hexane. These and other similar techniques will be evident to those skilled in the art.

When it is desired to chemically convert the linear phosphonitrilic chloride polymer into another type of phosphazene polymer, subsequent reactions with an appropriate reactant may be effected in the same reaction solvent as used in the second stage. Indeed in such cases it is unnecessary to isolate or recover the linear phosphonitrilic chloride polymer formed in the second stage as the ensuing reaction(s) may be effected in the same solution. Alternatively, such subsequent reactions may be effected in a fresh solution and, if desired, in a different inert solvent.

In accordance with a preferred embodiment, the reaction mixture from the second stage reaction is extracted with a suitable inert solvent such as pentane, hexane or heptane in order to recover the cyclic oligomers present in the reaction mixture. As pointed out above, all or a portion of these recovered cyclic oligomers may be used in the first stage of the process.

The first and second stages may be conducted in separate reactors. A feature of this invention, however, is the fact that both stages may be performed in the same reaction vessel, provided of course that it is appropriately sized to handle the quantities of material involved in each stage. Thus in accordance with a preferred embodiment of this invention, both stages are conducted in the same reactor. It is further preferred to introduce a solvent for the second stage into such reactor upon or near the completion of the first stage. However, both stages may be conducted in the presence of a solvent, if desired.

The practice of this invention will be still further apparent from the following illustrative example which is not to be construed in a limiting sense.

EXAMPLE

To a one liter, five-neck round bottom flask, cradled in a heating mantle and fitted with a mechanical stirrer, a thermometer, a nitrogen inlet tube and a gas/vapor outlet tube were added 250 g of low molecular weight linear phosphonitrilic chloride oligomer having an average degree of polymerization (n in $[Cl-(PCl_2=N)_n-PCl_3]^+PCl_6^-$) falling in the range of 4 to 6 and 25.8 g of ammonium chloride. (The NMR spectrum of this oligomer indicated that about 7 percent of the oligomer had a degree of polymerization of 2 with the balance having a degree of polymerization ranging from 3 to 10.) The mixture was stirred and gradually heated. The reaction started at about 160°–165° C. The temperature was then kept at 170°–175° C. for three hours. A small sample of the reaction mixture was withdrawn and analyzed. The $P^{31}$ NMR analysis of the reaction mixture indicated the following product composition:

| | |
|---|---|
| Cyclic (PNCl$_2$)$_{3-4}$ | 2.4% |
| Low linear PNCl$_2$ oligomer | 32.0% |
| Linear PNCl$_2$ polymer | 65.6% |

Then, in the second stage, the temperature was raised to 200° C. and nitrogen sweeping was started to separate cyclic phosphonitrilic chloride oligomer formed during the reaction. The conversion of the lower molecular weight linear phosphonitrilic chloride into higher molecular weight linear phosphonitrilic chloride polymer was complete in about four hours at 200° C. The second stage reaction was terminated at the end of 4.5 hours at 200° C. The resultant phosphonitrilic chloride polymer was then dissolved in toluene to leave unreacted (excess) ammonium chloride on the bottom of the flask. The yield of linear phosphonitrilic chloride polymer formed in the process was more than 60% based on starting phosphonitrilic chloride oligomer. A small sample of this polymer was converted to poly(phenoxyphosphazene) by reaction with sodium phenoxide and the poly(phenoxyphosphazene) so formed was subjected to molecular weight determinations. GPC analysis and viscosity measurements of the phenoxy-substituted polyphosphazene indicated the following values for average molecular weight and intrinsic viscosity [$\eta$]:

| | |
|---|---|
| [$\eta$] | 0.21 |
| Mw | 115,400 |
| Mn | 35,500 |
| Mw/Mn | 3.25 |

The phenoxy-substituted polyphosphazene used in these determinations was prepared in the following manner: 102 mL of the above polymer solution was diluted with 100 mL of toluene, the diluted solution was allowed to stand overnight to allow a trace amount of unreacted NH$_4$Cl to settle, and the clear solution was then reacted with 0.32 mole of sodium phenoxide in 200 mL of diglyme for 64 hours at 110° C. In this operation 26.9 g of poly(phenoxy phosphazene) was formed. The intrinsic viscosity of the poly(phenoxyphosphazene) was measured in tetrahydrofuran at 25° C.

The linear phosphonitrilic chloride polymers produced in accordance with this invention are useful for a variety of applications. By way of example these linear polymers when of relatively low molecular weight are useful as intermediates in the synthesis of hydraulic fluids, lubricants and flame retardants. In particular the linear phosphonitrilic chloride polymers preferably having average degrees of polymerization below about 50 may be substituted with aryloxy and/or alkoxy groups to form products useful as hydraulic fluids, lubricants and flame retardants. Methods for effecting such substitution are well known in the art and are described for example in U.S. Pat. Nos. 3,443,913; 3,856,712; 3,883,451; and 4,055,523. Alternatively aryloxy and alkoxy substituted linear polymers of higher average degrees of polymerization containing ethylenic unsaturation can be compounded and cured by cross-linking to produce elastomers, coatings, adhesives, potting compounds, thermoset plastics and flexible or rigid foams. Note in this connection U.S. Pat. No. 4,264,531. Still other uses for the linear phosphonitrilic chloride polymers producible by the process of this invention will be apparent to those skilled in the art and are reported in the literature.

I claim:

1. In a process for producing linear phosphonitrilic chloride polymers from phosphonitrilic chloride oligomers of lower molecular weight the improvement pursuant to which a mixture of phosphonitrilic chloride oligomers enriched in linear phosphonitrilic chloride oligomer and comprising predominantly oligomer represented by the formula:

$$[Cl-(PCl_2=N)_n-PCl_3]^+PCl_6^-$$

wherein n is a numeral which averages at least 3 and at least a stoichiometric amount of ammonium chloride or ammonia, or both, is heated in a first stage to a reaction temperature in the range of from about 120° to about 200° C. for from about 0.5 to about 15 hours while concurrently removing hydrogen chloride to produce an intermediate reaction product, and then in a second stage the reaction product is heated to a higher temperature in the range of from about 150° to about 280° C. for from about 1 to about 36 hours to increase the molecular weight of the polymer.

2. In a process for producing linear phosphonitrilic chloride polymers from phosphonitrilic chloride oligomers of lower molecular weight the improvement pursuant to which a mixture of phosphonitrilic chloride oligomers enriched in linear phosphonitrilic chloride oligomer and comprising predominantly oligomer represented by the formula:

[Cl—(PCl$_2$=N)$_n$—PCl$_3$]$^+$PCl$_6$$^-$ wherein n is a numeral which averages at least 3 and an excess of ammonium chloride or ammonia, or both, is heated in a first stage to a reaction temperature in the range of from about 120° to about 200° C. for from about 0.5 to about 15 hours while concurrently removing hydrogen chloride to produce an intermediate reaction product, and then in a second stage the reaction product is heated to a higher temperature in the range of from about 150° to about 280° C. for from about 1 to about 36 hours to increase the molecular weight of the polymer.

3. A process according to claim 2 wherein the oligomer is a mixture of linear and cyclic oligomers predominating in linear oligomers.

4. A process according to claim 2 wherein the oligomer is substantially a mixture of linear oligomers.

5. A process according to claim 2 wherein cyclic phosphonitrilic chloride oligomers are separated from the linear phosphonitrilic chloride polymer after the start of said second stage.

6. A process according to claim 5 wherein separation of cyclic phosphonitrilic chloride oligomer vapor during at least a portion of the second stage reaction is effected by sweeping the heated reaction mixture with an inert vapor or gas.

7. A process according to claim 5 wherein separation of cyclic phosphonitrilic chloride oligomer during at least a portion of the second stage reaction is effected by reducing the pressure on the heated reaction mixture to below atmospheric pressure.

8. A process according to claim 5 wherein at least a portion of the second stage reaction is performed in a boiling inert solvent whereby the solvent vapors drive off cyclic phosphonitrilic chloride oligomer.

9. A process according to claim 5 wherein cyclic phosphonitrilic chloride oligomers are separated from the linear phosphonitrilic chloride polymer after the end of said second stage.

10. A process according to claim 2 wherein cyclic phosphonitrilic chloride oligomers are separated from the linear phosphonitrilic chloride polymer after the end of said second stage and at least a portion of said cyclic phosphonitrilic chloride oligomers are employed in a subsequent first stage reaction.

11. A process according to claim 2 wherein at least a portion of the first stage reaction is performed in bulk.

12. A process according to claim 2 wherein both stages are conducted in the same reactor.

13. A process according to claim 2 wherein at least a portion of the second stage reaction is conducted in an inert solvent.

14. A process according to claim 13 wherein the solvent is an aromatic solvent.

15. A process according to claim 14 wherein the solvent is a chloroaromatic solvent.

16. A process according to claim 15 wherein the solvent is chlorobenzene or a dichlorobenzene.

17. A process according to claim 16 wherein the solvent is ortho-dichlorobenzene.

18. A process according to claim 13 wherein the amount of solvent employed is regulated to keep the reaction mixture in a relatively concentrated reaction solution while avoiding excessive gelation.

19. A process according to claim 18 wherein the solvent is introduced into the reactor upon completion of the first stage reaction.

20. A process according to claim 19 wherein the solvent is an inert aromatic solvent.

21. A process according to claim 2 wherein ammonium chloride is employed in at least the first stage, the ammonium chloride having a mean particle size below 100 microns.

22. A process according to claim 2 wherein ammonium chloride is employed in at least the first stage, the ammonium chloride having a mean particle size below 90 microns.

23. A process according to claim 2 wherein finely divided ammonium chloride is employed in at least the first stage, said ammonium chloride being generated in situ by reacting gaseous hydrogen chloride with gaseous ammonia.

24. In a process for producing linear phosphonitrilic chloride polymers from phosphonitrilic chloride oligomers of lower molecular weight the improvement pursuant to which a mixture of phosphonitrilic chloride oligomers enriched in linear phosphonitrilic chloride oligomer and comprising predominantly oligomer represented by the formula:

[Cl—(PCl$_2$=N)$_n$—PCl$_3$]$^+$PCl$_6$$^-$ wherein n is a numeral which averages in the range of 3–15 and at least a stoichiometric amount of ammonium chloride or ammonia, or both, is heated in a first stage to a reaction temperature in the range of from about 130° to about 180° C. for from about 1 to about 12 hours while concurrently removing hydrogen chloride to produce an intermediate reaction product, and then in a second stage the reaction product is heated to a higher temperature in the range of from about 170° to about 240° C. for from about 4 to about 24 hours to increase the molecular weight of the polymer.

25. A process according to claim 24 wherein the oligomer is a mixture of linear and cyclic oligomers predominating in linear oligomers.

* * * * *

UNITED STATES PATENT AND TRADEMARK OFFICE
CERTIFICATE OF CORRECTION

PATENT NO. : 4,522,795

DATED : JUNE 11, 1985

INVENTOR(S) : HSUEH M. LI

It is certified that error appears in the above-identified patent and that said Letters Patent is hereby corrected as shown below:

Column 3, line 60, reads "acid" and should read -- base --.

Signed and Sealed this

Third Day of September 1985

[SEAL]

Attest:

DONALD J. QUIGG

Attesting Officer     Acting Commissioner of Patents and Trademarks - Designate